(12) United States Patent
Cook

(10) Patent No.: US 9,310,175 B2
(45) Date of Patent: Apr. 12, 2016

(54) JAW-MOUNTED MAGNET ACCESSORY FOR CALIPERS

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 60 days.

(21) Appl. No.: 14/479,884

(22) Filed: Sep. 8, 2014

(65) Prior Publication Data

US 2016/0069656 A1    Mar. 10, 2016

(51) Int. Cl.
*G01B 5/14* (2006.01)
*G01B 3/00* (2006.01)
*H01F 7/06* (2006.01)

(52) U.S. Cl.
CPC ....... *G01B 3/002* (2013.01); *G01B 5/14* (2013.01); *H01F 7/06* (2013.01)

(58) Field of Classification Search
CPC .................................. G01B 3/002; G01B 5/14
USPC ............... 33/549, 783, 784, 792, 794, DIG. 1
See application file for complete search history.

(56) References Cited

U.S. PATENT DOCUMENTS

| | | | | |
|---|---|---|---|---|
| 4,151,653 A | * | 5/1979 | Nishina | G01B 3/20 33/501.06 |
| D257,130 S | * | 9/1980 | Sibukawa | D10/73 |
| 4,226,024 A | * | 10/1980 | Westerberg | G01D 5/147 33/783 |
| 4,468,649 A | | 8/1984 | Matsuhashi | |
| 4,575,702 A | | 3/1986 | Nitta et al. | |
| 5,574,381 A | | 11/1996 | Andermo et al. | |
| 5,901,458 A | | 5/1999 | Andermo et al. | |
| 5,973,494 A | | 10/1999 | Masreliez et al. | |
| 6,279,248 B1 | * | 8/2001 | Walters | G01B 3/205 33/1 PT |
| RE37,490 E | | 1/2002 | Andermo et al. | |
| 6,400,138 B1 | | 6/2002 | Andermo | |
| 7,009,480 B2 | | 3/2006 | Tsui et al. | |
| 7,530,177 B1 | * | 5/2009 | Meichle | G01B 3/205 33/708 |
| 8,183,965 B2 | | 5/2012 | Michael | |
| 8,350,663 B1 | | 1/2013 | Michael | |
| 2007/0055475 A1 | * | 3/2007 | Feldman | G01B 3/205 702/158 |
| 2009/0027149 A1 | | 1/2009 | Kocijan | |
| 2009/0113734 A1 | * | 5/2009 | Matsumiya | G01B 3/205 33/505 |
| 2014/0150272 A1 | * | 6/2014 | Emtman | G01B 3/30 33/558.04 |
| 2015/0247717 A1 | * | 9/2015 | Emtman | G01B 3/205 74/89 |
| 2015/0247742 A1 | * | 9/2015 | Cook | G01B 3/205 33/784 |
| 2015/0316365 A1 | * | 11/2015 | Emtman | G01B 3/008 33/701 |

* cited by examiner

*Primary Examiner* — G. Bradley Bennett
(74) *Attorney, Agent, or Firm* — Seed IP Law Group PLLC

(57) ABSTRACT

A jaw-mounted magnet accessory is provided for being coupled to a caliper measuring jaw. The jaw-mounted magnet accessory includes a magnet configuration and a mounting arrangement interface. The magnet configuration includes at least one magnet that produces a magnetic field that extends from an operational face of the magnet configuration. The jaw-mounted magnet accessory is configured to locate the operational face of the magnet configuration proximate to the workpiece engagement surface of the caliper jaw so as to hold a workpiece (e.g., made of ferrous material) against the workpiece engagement surface. Utilization of the magnetic field to hold the workpiece in flush alignment with the workpiece engagement surface makes it more convenient to handle small or thin workpieces and/or may increase the accuracy and repeatability for measurements of some workpieces.

20 Claims, 4 Drawing Sheets

JAW-MOUNTED MAGNET ACCESSORY FOR CALIPERS

BACKGROUND

1. Technical Field

The invention relates to precision measurement instruments, and to calipers with a movable jaw for measuring the dimensions of an object.

2. Description of the Related Art

Calipers utilize pairs of jaws for determining measurements. A first jaw is generally fixed at one end of a measurement scale while a second jaw is attached to a slider assembly that moves along the measurement scale. An outer dimension of an object may be measured by arranging the object between and against inner surfaces of the first and second jaws. An inner dimension of an object may be measured by arranging outer surfaces of the first and second jaws against the inner surfaces of the object (e.g., the walls of a hole). The slider assembly may be moved with a user's thumb.

For measuring the distance between the jaws of the caliper, electronic position encoders may be used, based on low-power inductive, position sensing technology for example. Such an encoder may comprise a readhead and a scale. The readhead may comprise a readhead sensor and readhead electronics. The readhead outputs signals that vary as a function of the position of the readhead sensor relative to the scale along a measuring axis. The scale may be affixed to an elongated scale member that includes a fixed first measuring jaw. The readhead is affixed to a slider assembly including the second measuring jaw, which is movable along the scale member. Measurements of the distance between the two measuring jaws may be determined based on the signals from the readhead.

Exemplary electronic calipers are disclosed in commonly assigned U.S. Pat. Nos. RE37490, 5,574,381, and 5,973,494, each of which is hereby incorporated by reference in its entirety. One deficiency in the use of prior calipers is that if the workpiece that is being measured is crooked or otherwise misaligned within the jaws of the caliper, then the desired outside measurement of the workpiece will likely be in error. A need exists for improving workpiece positioning alignment and/or repeatability in a caliper in an economical, ergonomically convenient, and intuitively understandable manner.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A jaw-mounted magnet accessory is provided for being coupled to a caliper measuring jaw that provides a workpiece engagement surface that is oriented normal to the measuring axis direction in a caliper. In various implementations, the jaw-mounted magnet accessory may include a magnet configuration and a mounting arrangement interface. The magnet configuration may comprise at least one magnet that produces a magnetic field that extends from an operational face of the magnet configuration. The jaw-mounted magnet accessory may be configured to be coupled to the caliper measuring jaw by a mounting arrangement that uses the mounting arrangement interface, such that the jaw-mounted magnet accessory is carried by the caliper measuring jaw. The jaw-mounted magnet accessory may be further configured to locate the operational face of the magnet configuration proximate to the workpiece engagement surface when the jaw-mounted magnet accessory is coupled to the caliper measuring jaw. The jaw-mounted magnet accessory may be further configured to produce the magnetic field proximate to the workpiece engagement surface and hold a workpiece against the workpiece engagement surface when the jaw-mounted magnet accessory is coupled to the caliper measuring jaw.

In accordance with another aspect, the magnet configuration may be configured to provide a single magnetic pole or multiple magnetic poles proximate to the operational face. In one implementation, at least one pair of magnetic poles may be provided having opposite polarity proximate to the operational face. In another implementation, a plurality of pairs of magnetic poles may be provided having opposite polarity proximate to the operational face.

In accordance with another aspect, the mounting arrangement may comprise one or more mounting recesses in the caliper measuring jaw, and the mounting arrangement interface may comprise outer surfaces of the jaw-mounted magnet accessory that are shaped to at least partially fit within the one or more mounting recesses. In one implementation, the one or more mounting recesses may include one or more openings in at least one of a top or bottom surface of the caliper measuring jaw that is oriented transverse to the workpiece engagement surface. In another implementation, the one or more mounting recesses may include one or more openings in at least one of a back or front surface of the caliper measuring jaw that is oriented transverse to the measuring axis. In such implementations with mounting recesses, the jaw-mounted magnet accessory may be configured to locate the operational face of the magnet configuration adjacent to an inside surface of a wall of material that forms the workpiece engagement surface.

In accordance with another aspect, the jaw-mounted magnet accessory may comprise a clip that wraps around the caliper measuring jaw when the jaw-mounted magnet accessory is coupled to the caliper measuring jaw, and the mounting arrangement interface may comprise one or more surfaces of the clip. In one implementation, the clip may comprise material that is magnetized to provide the magnet configuration. The magnetized material may extend to a region proximate to the workpiece engagement surface when the jaw-mounted magnet accessory is coupled to the caliper measuring jaw, in order to locate the operational face of the magnet configuration proximate to the workpiece engagement surface. In such implementations, the operational face may be located approximately adjacent to at least one of an upper or lower edge of the workpiece engagement surface.

In accordance with another aspect, the jaw-mounted magnet accessory may comprise an interface module which includes the magnet configuration and the mounting arrangement interface. In one implementation, the interface module may comprise material that is magnetized to provide the magnet configuration.

In accordance with another aspect, the interface module may include a magnetic field actuating portion with an actuator that is operable by a user to adjust the magnetic field produced proximate to the workpiece engagement surface. In various implementations, the actuator may be connected to move the operational face of the magnet configuration relative to the workpiece engagement surface, or to move a magnet having a magnetic pole included in the magnet configuration, or to move a magnetic path material included in the magnet configuration. In one implementation, at least one magnet of the magnet configuration may comprise an electromagnet, and the magnetic field actuating portion may comprise a circuit that powers the electromagnet including a switch that turns the electromagnet off and on.

In accordance with another aspect, the magnet configuration may include a first plurality of magnets that present first-polarity poles toward the operational face, interleaved with a second plurality of magnets that include second-polarity poles. The actuator may be connected to move at least one of the second plurality of magnets, to alter a physical relationship between the first-polarity poles of the first plurality of magnets and the second-polarity poles of the second plurality of magnets. In one implementation, the second plurality of magnets may be mounted to rotate about a shaft in the interface module and may include both first-polarity and second-polarity poles distributed over respective angular ranges about the shaft. The actuator may be connected to rotate at least one of the second plurality of magnets between a position where a second-polarity pole is presented toward the operational face and a position where a first-polarity pole is presented toward the operational face.

In accordance with another aspect, the jaw-mounted magnet accessory may be configured to be coupled to the caliper measuring jaw by a user using only force exerted by the user's hands and without the need for a tool separate from the jaw-mounted magnet accessory and without the need for a fastener separate from the jaw-mounted magnet accessory.

DETAILED DESCRIPTION

Figure 1:
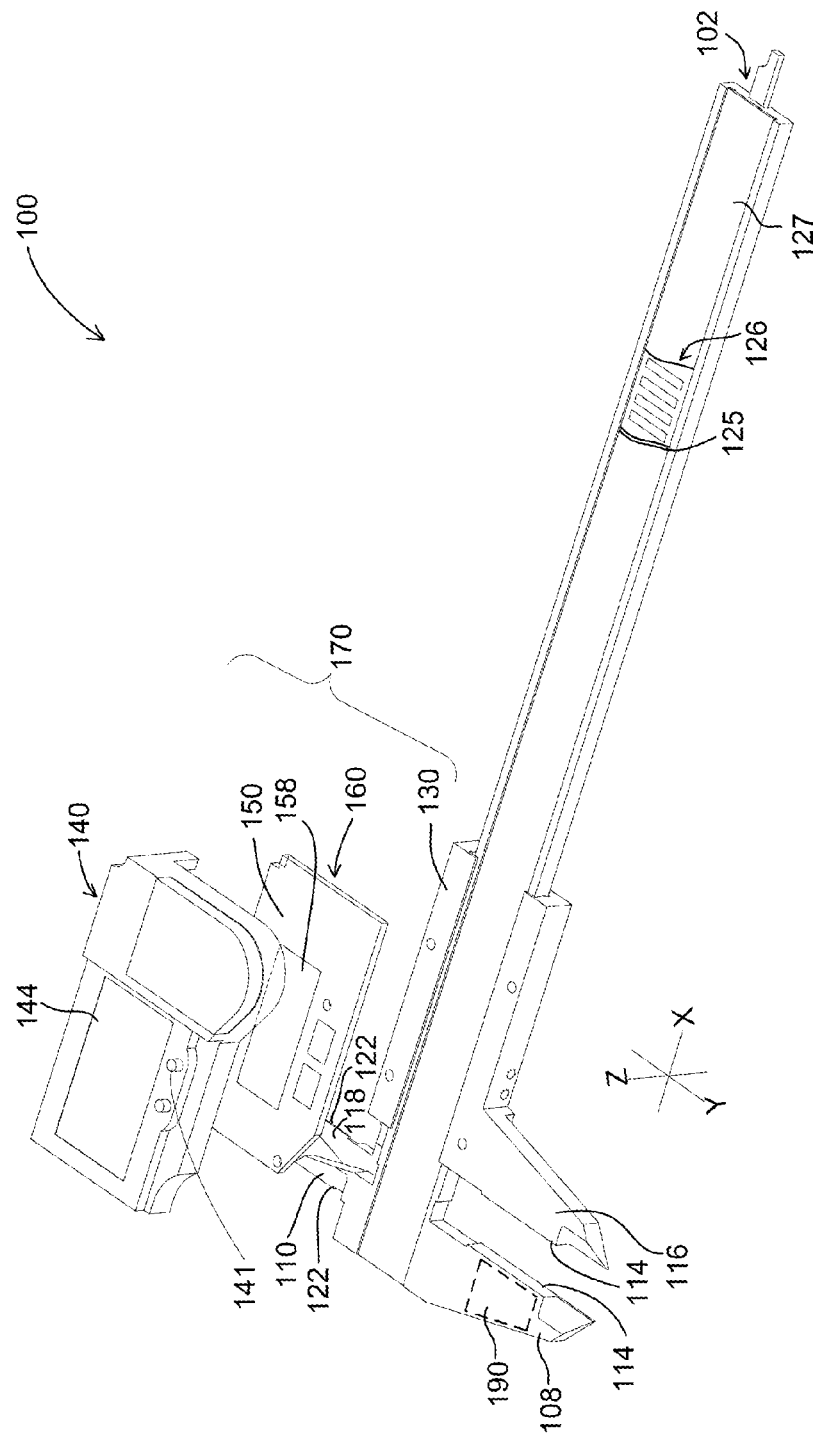
FIG. 1 is an exploded isometric view diagram of a hand tool type caliper including a scale and slider adaptable for use with a jaw-mounted magnet accessory according to principles disclosed herein.

FIG. 1 is an exploded isometric view diagram of a hand tool type caliper 100. In this example, the caliper 100 comprises a slider displacement sensor 158 (e.g., an inductive sensor assembly) and a scale substrate 125 including a scale track 126 (a cut-away segment of each is illustrated) positioned in a groove 127 along an elongated scale member 102. In other embodiments other types of slider displacement sensors 158 may be utilized (e.g., capacitive, etc.) A slider assembly 170 includes an electronic assembly 160 attached to a slider 130. The slider displacement sensor 158 is included in the electronic assembly 160.

The mechanical structure and operation of the caliper 100 may be similar to that of certain prior electronic calipers, such as that of commonly assigned U.S. Pat. No. 5,901,458, which is hereby incorporated herein by reference in its entirety. The scale member 102 is a rigid or semi-rigid bar which may include grooves and/or other features incorporated into a generally rectangular cross section. The scale substrate 125 may be rigidly bonded in the groove 127, and the scale track 126 may include scale elements that cooperate with corresponding elements (not shown) of the slider displacement sensor 158, in a manner similar to that used in known electronic calipers and as described in the previously incorporated U.S. Pat. Nos. RE37490 and 5,901,458 patents, and in commonly assigned U.S. Pat. No. 6,400,138, which is hereby incorporated herein by reference in its entirety.

A pair of measuring jaws 108 and 110 are formed near a first end of the scale member 102. A corresponding pair of measuring jaws 116 and 118 are formed on the slider 130. The outside dimensions of a workpiece are measured by placing the workpiece between a pair of engagement surfaces 114 of the measuring jaws 108 and 116. Similarly, the inside dimensions of a workpiece are measured by placing a pair of engagement surfaces 122 of the measuring jaws 110 and 118 against opposing internal surfaces of the workpiece. In a position sometimes called the zero position, the engagement surfaces 114 abut one another, the engagement surfaces 122 are aligned, and both the outside and inside dimensions measured by the caliper 100 may be indicated as zero.

The measured dimension may be displayed on a digital display 144, which is mounted within a cover 140 of the electronic assembly 160 of the caliper 100. The electronic assembly 160 may also include a push button switch 141 (e.g., an "origin" switch), and a signal processing and display circuit 150, which may include a circuit board mounted to abut the top surfaces of the slider 130 on either side of the scale member 102.

In operation, in order to measure an outer dimension of a workpiece, a user may push the slider 130 toward the first end of the scale member 102 along the measuring axis direction, so that the workpiece is held between the engagement surfaces 114 of the measuring jaws 108 and 116. In accordance with principles disclosed herein, a jaw-mounted magnet accessory 190 may be coupled to one of the measuring jaws (e.g., measuring jaw 108). As will be described in more detail below with respect to FIGS. 2-6, a jaw-mounted magnet accessory may produce a magnetic field proximate to an engagement surface 114 (e.g., of the measuring jaw 108) for holding a workpiece against the engagement surface 114 so that an outside dimension of the workpiece may be measured.

Figure 2:
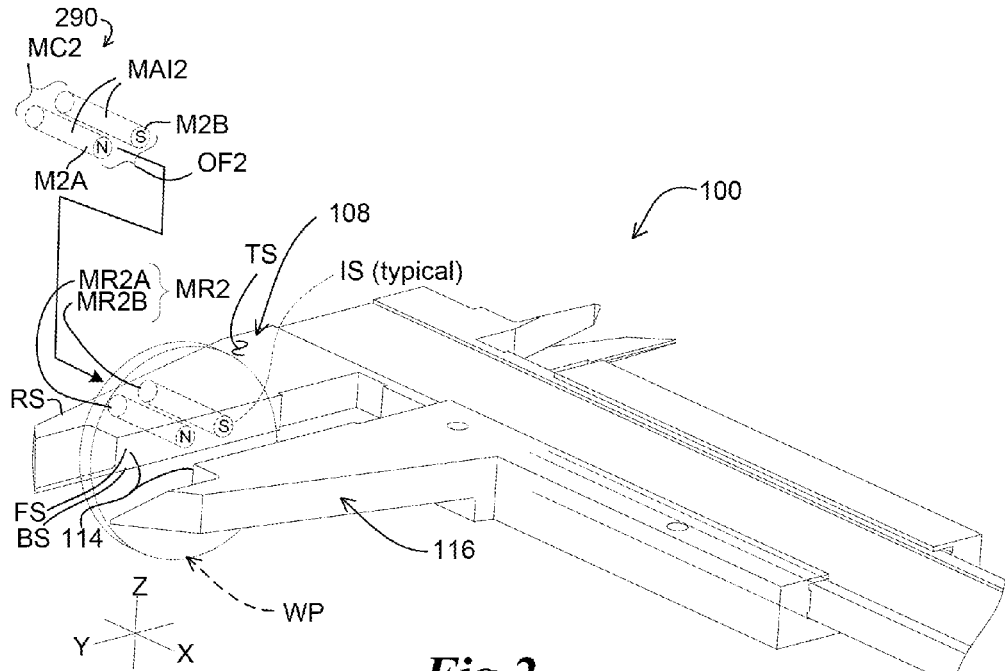
FIG. 2 is an isometric view diagram of a portion of the caliper of FIG. 1, including a first embodiment of a jaw-mounted magnet accessory.

FIG. 2 is an isometric view diagram of a portion of the caliper 100 of FIG. 1, including a first embodiment of a jaw-mounted magnet accessory 290. As shown in FIG. 2, the outside dimensions of a workpiece WP are measured by placing the workpiece WP between the pair of engagement surfaces 114 of the measuring jaws 108 and 116 of the caliper 100. As indicated, the workpiece engagement surfaces 114 are generally oriented normal to the measuring axis direction (e.g., the x-axis) of the caliper. The measuring jaw 108 is designated as having a top surface TS, a bottom surface BS, a rear surface RS and a front surface FS. In the implementation of FIG. 2, a pair of mounting recesses MR2A and MR2B have openings in the rear surface RS through which the jaw-mounted magnet accessory 290 may be inserted as part of a mounting arrangement for being coupled to the measuring jaw 108. It will be appreciated that in alternative implementations, mounting recesses may include openings in any of the measuring jaw surfaces TS, BS, RS or FS. As will be described in more detail below, in the implementation of FIG. 2 when the jaw-mounted magnet accessory 290 is coupled to the measuring jaw 108, an operational face OF2 of the magnet configuration MC2 is located adjacent to an inside surface IS of a wall of material that forms the front surface FS and corresponding engagement surface 114 of the measuring jaw 108.

The jaw-mounted magnet accessory 290 is illustrated as including a magnet configuration MC2 comprising a pair of bar magnets M2A and M2B. In various implementations, the bar magnets M2A and M2B may include permanent magnets, electromagnets, or any combinations thereof or other types of magnets. The cylindrical outer surfaces of the bar magnets M2A and M2B form a mounting arrangement interface MAI2 that is configured to fit within the mounting recesses MR2A and MR2B (collectively designated as a mounting recess MR2) of the measuring jaw 108. When the magnet configuration MC2 is coupled to the measuring jaw 108 by being inserted in the mounting recess MR2, an operational face OF2 of the magnet configuration MC2 is located proximate to the workpiece engagement surface 114 of the measuring jaw 108. The magnet configuration MC2 is configured to produce a magnetic field that extends from the operational face OF2. During operation, the jaw-mounted magnet accessory 290 produces the magnetic field (e.g., as schematically indicated by the opposite polarity magnetic poles N and S at the ends of the bar magnets M2A and M2B) proximate to the engagement surface 114 so as to hold the workpiece WP against the workpiece engagement surface 114 for a measurement.

It will be appreciated that when the workpiece WP is made of a ferrous or other magnetic material that is attracted by the magnetic field that extends from the operational face OF2, the workpiece WP will be held by the magnetic force against the engagement surface 114. This allows the workpiece WP to be held in a secure alignment (e.g., flush with the engagement surface 114) so as make it easier or more convenient to handle small or thin workpieces and/or to increase the repeatability and accuracy of measurements, particularly for small workpieces. It will be appreciated that this is in contrast to prior caliper configurations for which small workpieces may be dropped or mishandled and/or a misalignment of the workpiece relative to the engagement surface 114 would result in a measurement error.

Figure 3:
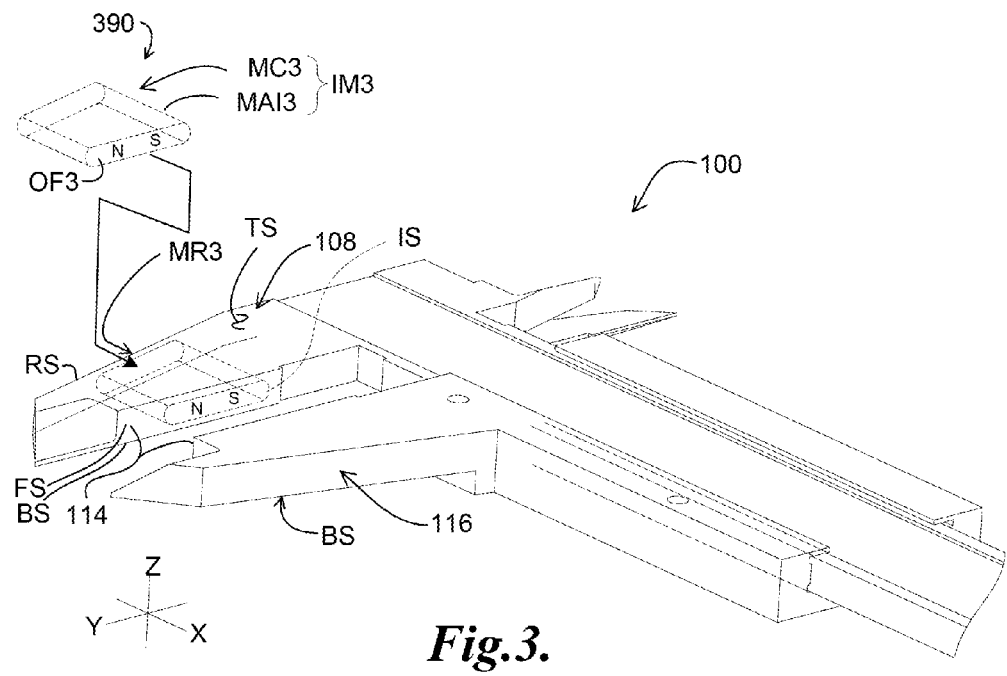
FIG. 3 is an isometric view diagram of a portion of the caliper of FIG. 1, including a second embodiment of a jaw-mounted magnet accessory.

FIG. 3 is an isometric view diagram of a second embodiment of a jaw-mounted magnet accessory 390. Various components of the jaw-mounted magnet accessory 390 may be similar to similarly numbered components of the jaw-mounted magnet accessory 290 of FIG. 2, and will be understood to function in a similar manner except as otherwise described below. As shown in FIG. 3, the jaw-mounted magnet accessory 390 includes an interface module IM3 comprising a magnet configuration MC3 and a mounting arrangement interface MAI3. In various implementations, the magnet configuration MC3 may be formed from various components (e.g., may include one or more magnets placed within a casing of the interface module IM3), or may be formed from magnetized material of the interface module IM3, etc.) The mounting arrangement interface MAI3 includes the outer surfaces of the interface module IM3 which are configured to fit within a mounting recess MR3 of the measuring jaw 108 of the caliper 100.

In the embodiment of FIG. 3, the mounting recess MR3 includes an opening in a rear surface RS of the measuring jaw 108, into which the mounting arrangement interface MAI3 may be inserted so that the jaw-mounted magnet accessory 390 is coupled to the measuring jaw 108. When the jaw-mounted magnet accessory 390 is coupled to the measuring jaw 108, the operational face OF3 of a magnet configuration MC3 is located adjacent to an inside surface IS of a wall of material that forms the front surface FS and corresponding engagement surface 114 of the measuring jaw 108. The magnet configuration MC3 produces a magnetic field (e.g., schematically indicated by the magnetic poles N and S) that extends from the operational face OF3 of the magnet configuration MC3. When the jaw-mounted magnet accessory 390 is coupled to the measuring jaw 108, the operational face OF3 is located to produce the magnetic field proximate to the engagement surface 114 of the measuring jaw 108 for holding a workpiece against the engagement surface 114.

Figure 4:
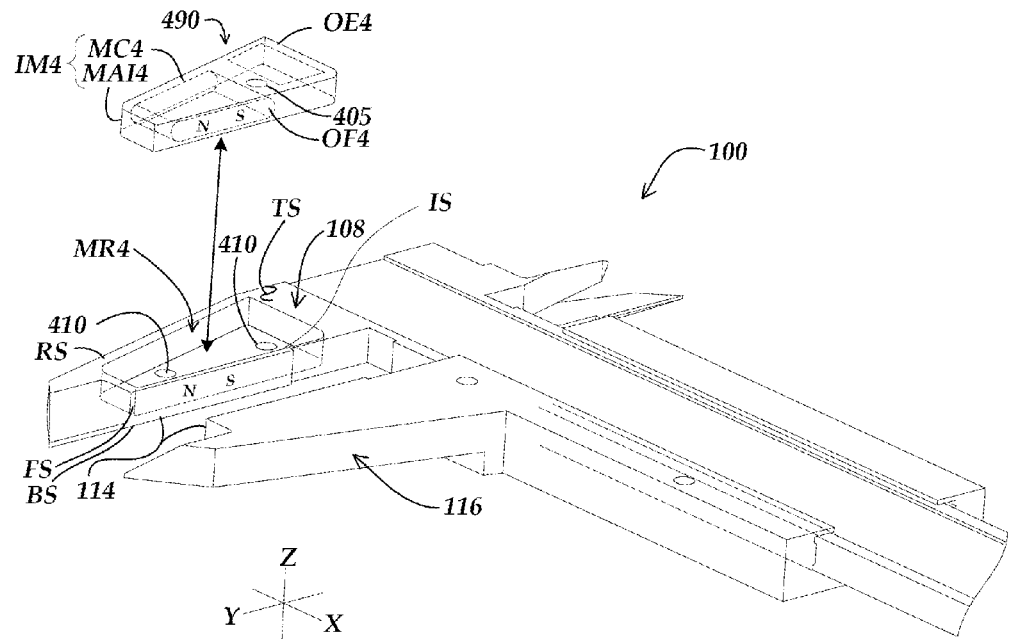
FIG. 4 is an isometric view diagram of a portion of the caliper of FIG. 1, including a third embodiment of a jaw-mounted magnet accessory.

FIG. 4 is an isometric view diagram of a third embodiment of a jaw-mounted magnet accessory 490. Various components of the jaw-mounted magnet accessory 490 may be similar to similarly numbered components of the jaw-mounted magnet accessories 290 and 390 described above, and will be understood to function in a similar manner except as otherwise described below. As shown in FIG. 4, the jaw-mounted magnet accessory 490 includes an interface module IM4 comprising a magnet configuration MC4 and a mounting arrangement interface MAI4. The mounting arrangement interface MAI4 comprises the outer surfaces of the interface module IM4 that are configured to be received within a mounting recess MR4 of the measuring jaw 108. In the configuration of FIG. 4, the mounting recess MR4 is shown to include an opening in a top surface TS of the measuring jaw 108. It will be appreciated that in other implementations, the mounting recess MR4 may also or alternatively have openings in other surfaces of the measuring jaw 108. The magnet configuration MC4 produces a magnetic field that extends from an operational face OF4 as schematically indicated by the opposite magnetic poles N and S. When inserted in the mounting recess MR4, the jaw-mounted magnet accessory 490 thus produces the magnetic field proximate to the engagement surface 114. As described above, the magnetic field may be utilized to hold a workpiece against the engagement surface 114 for maintaining a proper and repeatable alignment when an outside dimension of the workpiece is being measured.

The interface module IM4 is also indicated as including an area for an operating element OE4. In various implementations, the operating element OE4 may include elements such as a battery, switch, or plug for an external power source (e.g., if the magnet configuration MC4 includes an electromagnet). In other implementations, the operating element OE4 may include a handle or similar component for assisting with the insertion or removal of the jaw-mounted magnet accessory 490 to or from the mounting recess MR4 of the measuring jaw 108. As part of the mounting arrangement interface MAI4, other mounting features 405 may also be included on the interface module IM4, which may be configured to be engaged by corresponding mounting features 410 on the measuring jaw 108 (e.g., to secure the jaw-mounted magnet accessory 490 in a desired position/orientation within the mounting recess MR4). For example, in one specific example implementation, additional mounting features 405 on the interface module IM4 may comprise dimples or detents, that are shaped to be received within corresponding mounting features 410 (e.g., holes) within the mounting recess MR4 of the measuring jaw 108.

In various implementations, the interface module IM4 may be made to have a symmetric shape and may be reversible within the mounting recess MR4 for various purposes. For example, the interface module IM4 may be configured such that a strong magnetic field is primarily provided only at the operational face OF4, but is not provided on the opposite side of the interface module IM4. Thus, if a user reverses the orientation of the symmetric interface module IM4 within the mounting recess MR4, (e.g., for storage), a strong magnetic field will not be provided at the engagement surface 114. Alternatively, a separate storage recess may be provided elsewhere on the caliper 100 for storing the jaw-mounted magnet accessory 490. As will be described in more detail below with respect to FIG. 5, a jaw-mounted magnet accessory may also alternately mount to various surfaces of the measuring jaw 108, rather than being contained within a mounting recess.

Figure 5:
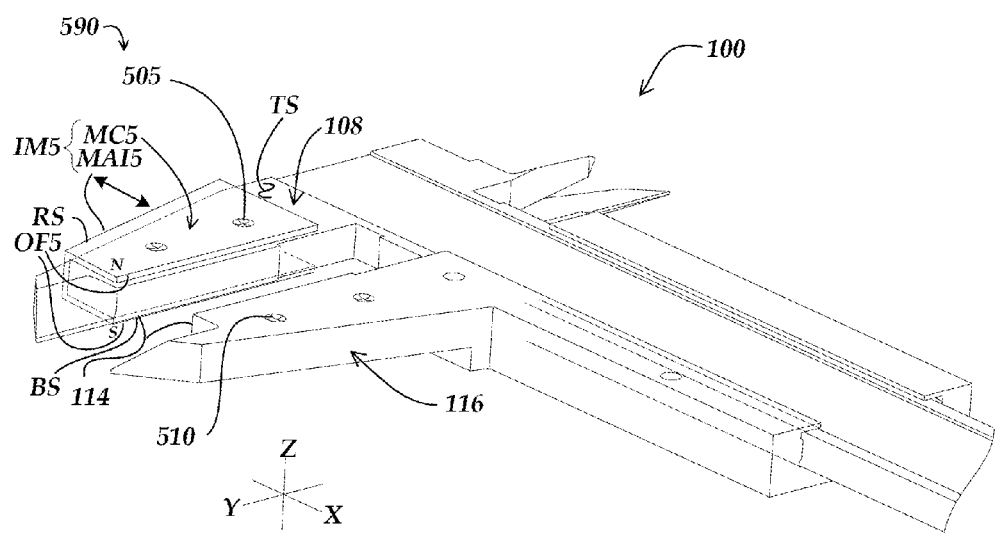
FIG. 5 is an isometric view diagram of a portion of the caliper of FIG. 1, including a fourth embodiment of a jaw-mounted magnet accessory.

FIG. 5 is an isometric view diagram of a fourth embodiment of a jaw-mounted magnet accessory 590. Various components of the jaw-mounted magnet accessory 590 may be similar to similarly numbered components of the jaw-mounted magnet accessories 290, 390 and 490 described above, and will be understood to function in a similar manner except as otherwise described below. As shown in FIG. 5, the jaw-mounted magnet accessory 590 includes an interface module IM5 comprising a magnet configuration MC5 and a mounting arrangement interface MAI5. In the implementation of FIG. 5, the jaw-mounted magnet accessory 590 is formed as a clip, and the mounting arrangement interface MAI5 comprises the surfaces of the clip which wrap around the measuring jaw 108. The magnet configuration MC5 produces a magnetic field that extends from an operating face OF5, as schematically indicated by the opposite magnetic poles N and S.

In the implementation of FIG. 5, the interface module IM5 includes material that is magnetized to provide the magnet configuration MC5. The magnetic material extends to a region proximate to the engagement surface 114 when the jaw-mounted magnet accessory 590 is coupled to the measuring jaw 108. In accordance with this configuration, the operational face OF5 of the magnet configuration MC5 is located approximately adjacent to both an upper edge UE and a lower edge LE of the engagement surface 114, and near the upper and lower surfaces of the clip.

As part of the mounting arrangement interface MAI5, other mounting features 505 may also be included on the interface module IM5, which may be configured to be engaged by corresponding mounting features 510 on the measuring jaw 108 (e.g., to secure the jaw-mounted magnet accessory 590 to the measuring jaw 108 at a specific position). For example, in one specific example implementation, the mounting features 505 on the interface module IM5 may comprise dimples or detents, that are shaped to be received within corresponding mounting features 510 (e.g., holes) of the measuring jaw 108. In various implementations, corresponding mounting features 510 may also be provided on the opposite measuring jaw 116, so that the jaw-mounted magnet accessory 590 may alternatively be coupled to the measuring jaw 116, or a pair of jaw-mounted magnet accessories 590 may be coupled to both of the measuring jaws 108 and 116. In general, the sliders and associated jaws of existing calipers have specified dimensions, and features to which external elements may be mounted, and in various implementations the mounting arrangement interface MAI5 is configured for being mounted utilizing a fastening configuration that is compatible with the existing mounting features and/or dimensions of existing calipers.

Figure 6:
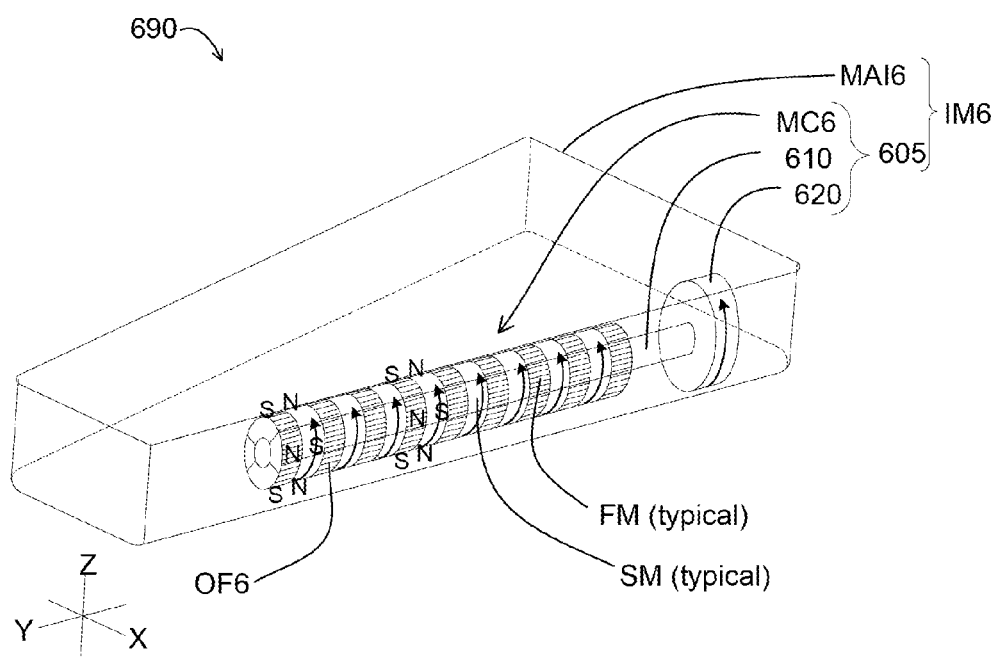
FIG. 6 is an isometric view diagram of a fifth embodiment of a jaw-mounted magnet accessory.

FIG. 6 is an isometric view diagram of a fifth embodiment of a jaw-mounted magnet accessory 690. Various components of the jaw-mounted magnet accessory 690 may be similar to similarly numbered components of the jaw-mounted magnet accessories 290, 390, 490 and 590 described above, and will be understood to function in a similar manner except as otherwise described below. As shown in FIG. 6, the jaw-mounted magnet accessory 690 includes an interface module IM6 comprising a magnetic field actuating portion 605 and a mounting arrangement interface MAI6. The mounting arrangement interface MAI6 may be similar to the mounting arrangement interface MAI4 of FIG. 4, and is correspondingly shaped to fit within a mounting recess (e.g., mounting recess MR4 of the measuring jaw 108 as illustrated in FIG. 4).

As shown in FIG. 6, the magnetic field actuating portion 605 includes a magnet configuration MC6, a shaft 610 and an actuator 620. The actuator 620 is connected to the shaft 610, which enables a user to adjust a magnetic field that extends from an operational face OF6 of the magnet configuration MC6. The magnet configuration MC6 includes a first plurality of magnets FM that present first-polarity poles N toward the operational face OF6 (e.g., as schematically indicated by the magnetic poles N for the first plurality of magnets FM in the position shown in FIG. 6). The first plurality of magnets FM are interleaved with a second plurality of magnets SM that present second-polarity poles S toward the operational face OF6 in the position illustrated in FIG. 6.

The actuator 620 is connected to rotate the second plurality of magnets SM, so as to alter a physical relationship between the first-polarity poles N of the first plurality of magnets FM and the second-polarity of poles S of the second plurality of magnets SM. More specifically, in the implementation of FIG. 6, the second plurality of magnets SM are mounted to rotate about the shaft 610 and include both first-polarity poles N and second-polarity poles S distributed over respective angular ranges about the shaft 610. The actuator 620 is connected to rotate the second plurality of magnets SM between a position where the second polarity poles S are presented toward the operational face OF6 (e.g., as illustrated in FIG. 6) and an alternative position where first-polarity poles N are presented toward the operational face OF6. Thus, a user is able to utilize the actuator 620 to adjust the magnetic field that extends from the operational face OF6 and the corresponding strength for holding a workpiece.

It will be appreciated that while in the implementation of FIG. 6 the second plurality of magnets SM are rotated relative to the operational face OF6, in other implementations an actuator may be provided to move magnets or other elements in other directions for adjusting the magnetic field that is presented at the operational face. In addition, the magnet configuration MC6 may be formed utilizing different polarities of magnets in different configurations. For example, in one implementation a magnetic path material (e.g., a magnetic shunt piece) may be movable by an actuator to adjust the magnetic field produced at an operational face. As another example, one or more of the magnets of a magnet configuration may be slidable relative to one another as controlled by an actuator, so as to allow a magnetic field produced at an operational face to be adjusted. As another example, a mounting recess or mounting surface may be provided in or on the measuring jaw 108 with sufficient space so that a magnet configuration may be moved to different positions relative to the engagement surface 114, as may be done for any of the magnet configurations illustrated in FIGS. 2-6. Additional techniques for adjusting a magnetic field may also be utilized, such as using a Halbach array (e.g., with an actuator to alter its orientation), or such as those utilized for magnetic chucks and other devices, some of which are described in U.S. Pat. Nos. 4,468,649; 4,575,702; 8,183,965; and U.S. Publication No. 20090027149, which are each hereby incorporated herein by reference in their entireties.

Additional techniques for adjusting a magnetic field produced at the operational face may be provided, such as a configuration in which additional individual magnets, or magnetic shunts or pole pieces, may be added to or removed from the magnet configuration, or their relative positions altered therein. In addition, in order to maintain the magnet configuration in a desired position within the measuring jaw, one or more internal surfaces of the mounting recess, or another surface, may include a material (e.g., a ferrous material) so as to hold the magnet configuration (e.g., and the jaw-mounted magnet accessory as a whole) in its mounted position within the measuring jaw. Alternatively, in certain implementations it may be desirable that surfaces of the measuring jaw be made of a material (e.g., non-ferrous) so that remnant magnetization does not occur when the magnet configuration is removed. It will be appreciated that when the jaw-mounted magnet accessory is removed from the measuring jaw, the caliper may operate in a standard "non-magnetized" mode, in which a workpiece (e.g., made of a ferrous material) will not be attracted to the measuring jaw. It will be appreciated that a standard non-magnetized mode may also be advantageous for allowing the easy cleaning of ferrous debris off of the measuring jaw.

In various implementations (e.g., any of the embodiments disclosed herein), it may be desirable for the non-magnetized measuring jaw (e.g., measuring jaw 116) to be non-ferrous so that the measuring jaws 108 and 116 do not hold closed on themselves when the jaw-mounted magnet accessory is coupled to the measuring jaw 108. In an alternative implementation, it may be desirable for both of the measuring jaws 108 and 116 to be magnetized (e.g., with the measuring jaw 116 being ferrous, or including a separate jaw-mounted magnet accessory, etc.) so that the measurement force for holding a workpiece is self-supplied by the attraction between the measuring jaws 108 and 116. In various implementations, it may desirable to enable a user to select which of the measuring jaws 108 and 116 will be magnetized (e.g., a jaw-magnet accessory may be able to be coupled to either of the measuring jaws 108 or 116, or both, etc.).

In implementations where the magnet configuration includes an electromagnet, the magnetization may be provided from a DC current flowing through a coil in the magnet configuration. Power for the electromagnet may be provided by the caliper battery, or a separate battery, or a separate external power supply with a plug connection, etc. Alternatively, the measuring jaw may include ferrous material that may be magnetized by a DC current, and which will remain magnetized after the DC current is removed. For de-magnetization, in one implementation a decaying AC current may be utilized (e.g., for degaussing the material). In one implementation, a base station/caliper tool cradle that plugs into an external power supply may be utilized to magnetize or de-magnetize the measuring jaw.

It will be appreciated that the embodiments of the jaw-mounted magnet accessories outlined above are exemplary only and not limiting. In particular, it will be appreciated that in the illustrations showing two magnetic poles to schematically represent a magnet configuration and/or magnetic field, various similar embodiments may use a single magnetic pole proximate to the operational face (e.g., at least one magnet that produces a magnetic field that extends from an operational face of the magnet configuration), or additional magnetic poles may be provided proximate to the operational face by a variety of known methods (e.g., through the use of additional interleaved or laminated magnets and/or the use of shaped pole pieces for the magnets, or the like. It will be appreciated that magnetic field strength diminishes more quickly with distance from closely spaced magnetic poles than it does for widely spaced magnetic poles. Thus, the number of magnetic poles and/or magnetic pole spacing and/or distance of the operational face from the engagement surfaces may be varied and/or adjustable in various embodiments, in order to provide a desired amount of workpiece attraction and/or holding force. Furthermore, various elements shown and/or described as portions of monolithic or integrated structures may instead comprise assembled elements. Conversely, assembled elements may instead be provided within monolithic or integrated structures. Various alternative shapes and forms may be used to implement the principles disclosed herein. In addition, the various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A jaw-mounted magnet accessory for being coupled to a caliper measuring jaw that provides a workpiece engagement surface that is oriented normal to a measuring axis direction in a caliper, the jaw-mounted magnet accessory comprising:
   a magnet configuration comprising at least one magnet that produces a magnetic field that extends from an operational face of the magnet configuration; and
   a mounting arrangement interface,
   wherein:
   the jaw-mounted magnet accessory is configured to be coupled to the caliper measuring jaw by a mounting arrangement that uses the mounting arrangement interface, such that the jaw-mounted magnet accessory is carried by the caliper measuring jaw;
   the jaw-mounted magnet accessory is configured to locate the operational face of the magnet configuration proximate to the workpiece engagement surface when the jaw-mounted magnet accessory is coupled to the caliper measuring jaw; and
   the jaw-mounted magnet accessory is configured to produce the magnetic field proximate to the workpiece engagement surface and hold a workpiece against the workpiece engagement surface when the jaw-mounted magnet accessory is coupled to the caliper measuring jaw.

2. The jaw-mounted magnet accessory of claim 1, wherein the magnet configuration is configured to provide a single magnetic pole proximate to the operational face.

3. The jaw-mounted magnet accessory of claim 1, wherein the magnet configuration is configured to provide at least two magnetic poles proximate to the operational face.

4. The jaw-mounted magnet accessory of claim 3, wherein the at least two magnetic poles proximate to the operational face comprise at least one pair of poles having opposite polarity proximate to the operational face.

5. The jaw-mounted magnet accessory of claim 3, wherein the at least two magnetic poles proximate to the operational face comprise a plurality of pairs of poles having opposite polarity proximate to the operational face.

6. The jaw-mounted magnet accessory of claim 1, wherein the mounting arrangement comprises one or more mounting recesses in the caliper measuring jaw and the mounting arrangement interface comprises outer surfaces of the jaw-mounted magnet accessory that are shaped to at least partially fit within the one or more mounting recesses.

7. The jaw-mounted magnet accessory of claim 6, wherein the one or more mounting recesses include one or more openings in at least one of a top or bottom surface of the caliper measuring jaw that is oriented transverse to the workpiece engagement surface, or at least one of a back or front surface of the caliper measuring jaw that is oriented transverse to the measuring axis direction.

8. The jaw-mounted magnet accessory of claim 6, further comprising an interface module which includes the magnet configuration and the mounting arrangement interface.

9. The jaw-mounted magnet accessory of claim 1, wherein the jaw-mounted magnet accessory comprises a clip that wraps around the caliper measuring jaw when the jaw-mounted magnet accessory is coupled to the caliper measuring jaw, and the mounting arrangement interface comprises one or more surfaces of the clip.

10. The jaw-mounted magnet accessory of claim 9, wherein the clip comprises material that is magnetized to provide the magnet configuration, and that extends to a region proximate to the workpiece engagement surface when the jaw-mounted magnet accessory is coupled to the caliper measuring jaw, in order to locate the operational face of the magnet configuration proximate to the workpiece engagement surface.

11. The jaw-mounted magnet accessory of claim 1, further comprising an interface module which includes the magnet configuration and the mounting arrangement interface.

12. The jaw-mounted magnet accessory of claim 11, wherein the interface module comprises material that is magnetized to provide the magnet configuration.

13. The jaw-mounted magnet accessory of claim 11, wherein the interface module includes a magnetic field actuating portion that is operable by a user to adjust the magnetic field produced proximate to the workpiece engagement surface.

14. The jaw-mounted magnet accessory of claim 13, wherein the magnetic field actuating portion includes at least one of a) an actuator connected to move the operational face of the magnet configuration relative to the workpiece engagement surface, or b) an actuator connected to move at least one of a magnet having a magnetic pole included in the magnet configuration, or a magnetic path material included in the magnet configuration, to adjust the magnetic field produced at the operational face.

15. The jaw-mounted magnet accessory of claim 14, wherein the magnet configuration includes a first plurality of magnets that present first-polarity poles toward the operational face, interleaved with a second plurality of magnets that include second-polarity poles, and the actuator is connected to move at least one of the second plurality of magnets, to alter a physical relationship between the first-polarity poles of the first plurality of magnets and the second-polarity poles of the second plurality of magnets.

16. The jaw-mounted magnet accessory of claim 15, wherein the second plurality of magnets are mounted to rotate about a shaft in the interface module and include both first-polarity and second-polarity poles distributed over respective angular ranges about the shaft, and the actuator is connected to rotate at least one of the second plurality of magnets between a position where a second-polarity pole is presented toward the operational face and a position where a first-polarity pole is presented toward the operational face.

17. The jaw-mounted magnet accessory of claim 13, wherein the at least one magnet of the magnet configuration comprises an electromagnet, and the magnetic field actuating portion comprises a circuit that powers the electromagnet including a switch that turns the electromagnet off and on.

18. The jaw-mounted magnet accessory of claim 1, wherein the jaw-mounted magnet accessory is configured to locate the operational face of the magnet configuration adjacent to an inside surface of a wall of material that forms the workpiece engagement surface or approximately adjacent to at least one of an upper or lower edge of the workpiece engagement surface.

19. The jaw-mounted magnet accessory of claim 1, wherein the jaw-mounted magnet accessory is configured to be coupled to the caliper measuring jaw by a user using only force exerted by the user's hands and without the need for a tool separate from the jaw-mounted magnet accessory and without the need for a fastener separate from the jaw-mounted magnet accessory.

20. A method for holding a workpiece against a workpiece engagement surface of a caliper measuring jaw for measuring an outer dimension of the workpiece, the workpiece engagement surface being oriented normal to a measuring axis direction in the caliper measuring jaw, the method comprising:
coupling a jaw-mounted magnet accessory to the caliper measuring jaw, the jaw-mounted magnet accessory comprising:
a magnet configuration comprising at least one magnet that produces a magnetic field that extends from an operational face of the magnet configuration; and
a mounting arrangement interface,
wherein:
the jaw-mounted magnet accessory is configured to be coupled to the caliper measuring jaw by a mounting arrangement that uses the mounting arrangement interface, such that the jaw-mounted magnet accessory is carried by the caliper measuring jaw;
the jaw-mounted magnet accessory is configured to locate the operational face of the magnet configuration proximate to the workpiece engagement surface when the jaw-mounted magnet accessory is coupled to the caliper measuring jaw; and
the jaw-mounted magnet accessory is configured to produce the magnetic field proximate to the workpiece engagement surface and hold the workpiece against the workpiece engagement surface when the jaw-mounted magnet accessory is coupled to the caliper measuring jaw;
placing the workpiece engagement surface against the workpiece for utilizing the magnetic field to hold the workpiece; and
utilizing the caliper measuring jaw to measure an outer dimension of the workpiece while the workpiece is held by the magnetic field against the workpiece engagement surface.

* * * * *